US010761344B1

(12) United States Patent
Schmalenberg et al.

(10) Patent No.: US 10,761,344 B1
(45) Date of Patent: Sep. 1, 2020

(54) SYSTEMS AND METHODS FOR GENERATING A VOLUMETRIC IMAGE AND INTERACTING WITH THE VOLUMETRIC IMAGE USING A PLANAR DISPLAY

(71) Applicant: Toyota Motor Engineering & Manufacturing North America, Inc., Plano, TX (US)

(72) Inventors: Paul Schmalenberg, Ann Arbor, MI (US); Ercan M. Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/270,314

(22) Filed: Feb. 7, 2019

(51) Int. Cl.
*G02B 30/56* (2020.01)
*G02F 1/1677* (2019.01)
(Continued)

(52) U.S. Cl.
CPC .......... *G02B 30/56* (2020.01); *G02F 1/0126* (2013.01); *G02F 1/1677* (2019.01);
(Continued)

(58) Field of Classification Search
CPC ....... G02B 30/56; G02B 27/28; G02F 1/1685; G02F 1/1677; G02F 1/0126; G09G 3/003; B29C 64/135; H04N 13/39
See application file for complete search history.

(56) References Cited

U.S. PATENT DOCUMENTS 5,956,172 A * 9/1999 Downing ............... H04N 13/39
359/326
6,466,184 B1 * 10/2002 Whitesell ............... G09G 3/025
345/6
(Continued)

FOREIGN PATENT DOCUMENTS

| CN | 205405074 U | 7/2016 |
|---|---|---|
| DE | 202006007288 U1 | 9/2006 |
| GB | 2446852 B | 12/2009 |

OTHER PUBLICATIONS

Smalley, et al., A Photophoretic-trap Volumetric Display, Springer Nature, Jan. 25, 2018, pp. 486-489, vol. 553, Macmillian Publishers Limited.

(Continued)

*Primary Examiner* — Sardis F Azongha
(74) *Attorney, Agent, or Firm* — Dinsmore & Shohl LLP

(57) ABSTRACT

A system includes a photophoretic display device including a trap light source and an illumination light source, an image converter including a light signal propagation director and a light signal sensor, and a control unit. The trap light source is configured to trap a scattering particle and the illumination light source is configured to illuminate the scattering particle that the trap light source is configured to trap such that the photophoretic display device generates a volumetric image. The light signal propagation director is configured to direct a visual signal of the volumetric image to the light signal sensor. The light signal sensor is configured to sense the visual signal and to generate a planar image signal based on the visual signal. The control unit is configured to send the planar image signal, receive a user input signal in response to sending the planar image signal, and control one or more of the trap light source and the illumination light source to change the volumetric image based on the user input signal.

20 Claims, 4 Drawing Sheets

(51) Int. Cl.
*G02F 1/1685* (2019.01)
*G02F 1/01* (2006.01)
*G09G 3/00* (2006.01)
*G06F 3/0488* (2013.01)
*G06F 3/16* (2006.01)

(52) U.S. Cl.
CPC ........... *G02F 1/1685* (2019.01); *G09G 3/003* (2013.01); *G06F 3/04883* (2013.01); *G06F 3/167* (2013.01); *G09G 2320/0693* (2013.01); *G09G 2354/00* (2013.01)

(56) References Cited

U.S. PATENT DOCUMENTS

| | | | | |
|---|---|---|---|---|
| 7,533,995 | B2* | 5/2009 | Momiuchi | G03B 21/00 |
| | | | | 353/62 |
| 7,554,541 | B2 | 6/2009 | Fitzmaurice et al. | |
| 7,583,252 | B2 | 9/2009 | Kurtenbach et al. | |
| 8,704,822 | B2 | 4/2014 | Butler et al. | |
| 9,200,779 | B2* | 12/2015 | Levola | H04N 13/39 |
| 9,323,068 | B2* | 4/2016 | Xin | H04N 13/39 |
| 10,129,517 | B2* | 11/2018 | Smalley | H04N 13/398 |
| 10,523,924 | B2* | 12/2019 | Lippert | H04N 9/3129 |
| 2004/0227694 | A1* | 11/2004 | Sun | G09G 3/003 |
| | | | | 345/6 |
| 2007/0242324 | A1* | 10/2007 | Chen | G02B 30/50 |
| | | | | 359/9 |
| 2007/0247595 | A1* | 10/2007 | Refai | G03B 35/20 |
| | | | | 353/94 |
| 2010/0066730 | A1* | 3/2010 | Grossman | H04N 13/39 |
| | | | | 345/419 |
| 2011/0001429 | A1* | 1/2011 | Davis | G09G 3/003 |
| | | | | 315/111.21 |
| 2011/0225523 | A1 | 9/2011 | Newton et al. | |
| 2013/0341508 | A1* | 12/2013 | Betsui | H04N 13/39 |
| | | | | 250/329 |
| 2014/0185284 | A1* | 7/2014 | Hsu | G02B 5/0242 |
| | | | | 362/231 |
| 2018/0267326 | A1* | 9/2018 | Broadbent | G09G 3/025 |
| 2019/0016052 | A1* | 1/2019 | Clark | B33Y 50/00 |

OTHER PUBLICATIONS

McDonald, Glenn, New Technique Generates Free-Floating 3D Images. Just Don't Call It a Hologram, Seeker, https://www.seeker.com/gadgets/new-technique-generates-free-floating-3d-images-just-dont-call-it-a-hologram, published Jan. 24, 2018, 5 pages.

Smalley et al., Volumetric Displays: Turning 3-D Inside-Out, Optics & Photonics News, https://www.osa-opn.org/home/articles/volume_29/june_2018/features/volumetric_displays_turning_3-d_inside-out/, published Jun. 2018, 6 pages.

\* cited by examiner

SYSTEMS AND METHODS FOR GENERATING A VOLUMETRIC IMAGE AND INTERACTING WITH THE VOLUMETRIC IMAGE USING A PLANAR DISPLAY

TECHNICAL FIELD

The present specification generally relates to systems and methods for rendering images and more specifically to systems and methods for generating a volumetric image and interacting with the volumetric image using a planar display.

BACKGROUND

Images may be capable of display on flat screens, such as the flat displays of portable electronic devices. Such screens may be configured to receive a user input and generate a user input signal that, in some cases, may be used to affect the image. For example, one or more pixels on the display may change state based on a user input signal. However, such user input signals may not be capable of affecting a volumetric image using the current technology. Accordingly, systems and methods for generating a volumetric image and interacting with the volumetric image using a planar display may be required.

SUMMARY

In one embodiment, a system includes a photophoretic display device including a trap light source and an illumination light source, an image converter including a light signal propagation director and a light signal sensor, and a control unit. The trap light source is configured to trap a scattering particle and the illumination light source is configured to illuminate the scattering particle that the trap light source is configured to trap such that the photophoretic display device generates a volumetric image. The light signal propagation director is configured to direct a visual signal of the volumetric image to the light signal sensor. The light signal sensor is configured to sense the visual signal and to generate a planar image signal based on the visual signal. The control unit is configured to send the planar image signal, receive a user input signal in response to sending the planar image signal, and control one or more of the trap light source and the illumination light source to change the volumetric image based on the user input signal.

In another embodiment, a system includes a photophoretic display device configured to generate a volumetric image, a light signal propagation director, a light signal sensor, and a control unit. The light signal propagation director propagates the volumetric image to the light signal sensor and the control unit generates a two-dimensional image based on an output of the light signal sensor.

In yet another embodiment, a method of changing a volumetric image includes displaying the volumetric image using a photophoretic trap display comprising a trap light source configured to trap one or more scattering particles and an illumination light source configured to illuminate the one or more scattering particles, directing light from the volumetric image to a light signal sensor with a light signal propagation director, generating a planar image based on an output of the light signal sensor, rendering the planar image and displaying the planar image on a planar display, capturing a user input, generating a user input signal based on the user input, and changing the volumetric image based on the user input signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
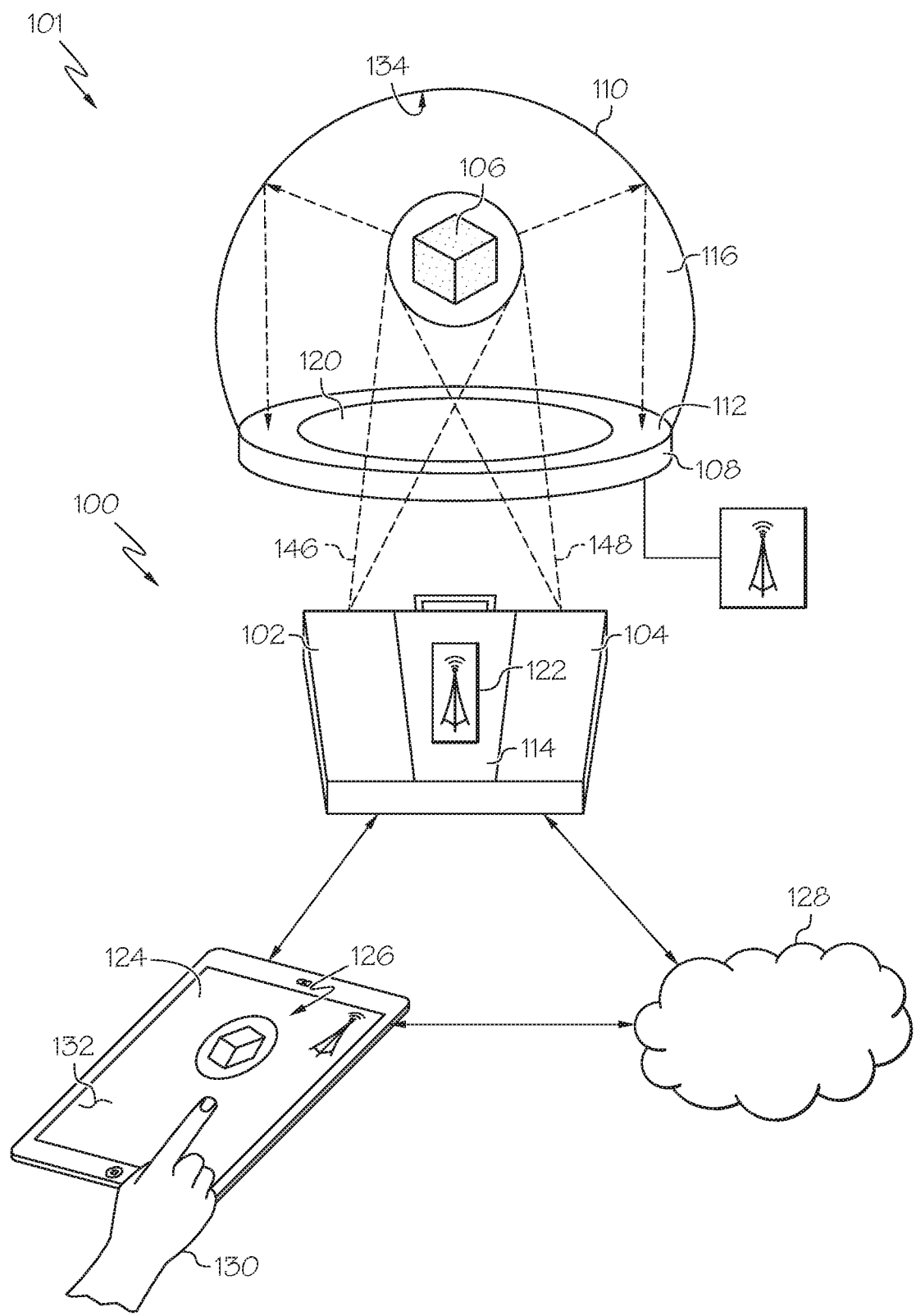
FIG. 1 depicts an exemplary embodiment of a system for rendering a volumetric image and interacting with the volumetric image using a planar display, according to one or more embodiments shown and described herein.

Three-dimensional images of objects may be useful for depicting aspects of images that may be hidden or obscured on a two-dimensional rendering of the same object. However, many devices that include planar displays may be incapable of generating and/or displaying three-dimensional images. Moreover, systems capable of generating three-dimensional images may lack suitable hardware and/or software to manipulate such images, leaving users without a capability to affect the images.

It may be possible to generate a three-dimensional image using a photophoretic display device. A photophoretic display device uses the photophoretic effect, or photophoresis, to physically control (i.e., move, manipulate, reposition, etc.) and illuminate one or more microscopic particles. Photophoresis refers to using light to impart forces on objects. For example, micron-sized particles may be suspended in air with light through direct and/or indirect photophoresis. Micron-sized particles may be suspended in a gas (e.g., aerosols) or a liquid (e.g., hydrocolloids) and may move when a light beam (e.g., a laser) of sufficient intensity illuminates the particle. This movement may be due to radiation pressure force (direct photophoresis) and/or a non-uniform distribution of temperature of the particles in the fluid medium (indirect photophoresis). Relatedly, in a fluid mixture of different types of particles, particles may move differently from one another based on differences in size, shape, thermal radiation absorption characteristics and other characteristics (thermophoresis).

Direct photophoresis occurs due to a transfer of photon momentum to a particle by refraction and reflection and a difference in refractive index between adjacent particles. More specifically, particles may move relative to their surrounding medium when there is a difference in the refractive index between the particle and the surrounding medium. The refractive index is the ratio of the velocity of light in a vacuum to its velocity in a specified medium. A particle with a higher refractive index compared to its surrounding molecule or molecules may move away from the light source at a higher rate than the surrounding medium due to a difference in rate of momentum transfer between the particle and the surrounding medium as energy is absorbed from the photons of light that are scattered and absorbed from the particle. This transfer of momentum from photon to particle is referred to as radiation pressure force and is the force responsible for direct photophoresis and is dependent on light intensity and particle size but the momentum transfer and thus movement of the particle is not affected by the surrounding medium.

Indirect photophoresis may also be used to displace particles. Indirect photophoresis occurs as light heats one side of a particle suspended in a medium resulting in a temperature differential across the particle. Molecules in the surrounding medium may reach temperature equilibrium with the surface of the particle, that is, the molecules surrounding the particle on the illuminated side may experience an increase in temperature and molecules on the relatively cool side may remain relatively cool. Generally, the molecules on the relatively heated side of the particle will have a higher kinetic energy. Thus, these higher energy molecules, when impinging the particle, may impart a greater momentum change to the particle than the molecules on the relatively cool side of the particle resulting in a momentum gradient across the particle and tending to move the particle toward the area of lower momentum (i.e., from the relatively hot region toward the relatively cold region). The component of the photophoretic force responsible for this phenomenon is called the radiometric force. The indirect photophoretic effect may be referred to as the "radiometric force."

Additionally, it is possible to select the wavelength of light and the particle size to control the movement of the particle. For example, a particle with a diameter less than or comparable to the wavelength of a given beam of light may be moved toward the light source due to negative indirect photophoresis. Negative indirect photophoresis may occur due to the unequal heat generation on the back and front sides of particles. That is, the wavelength of light may be selected such that it heats the side of a particle opposite the light source rather than the side of the particle facing the light source. This may result in a temperature gradient in the medium around the particle, causing the particle to move towards the light source.

An individual particle can be controlled using the photophoretic effect utilizing astigmatism aberration. In general, an ideal lens has a single focal point for the light passing through a first side of the lens. Optical aberrations can be added to a lens to spread the light passing through the lens over a region rather than at the single focal point. Aberrations can be monochromatic or chromatic. Chromatic aberrations may occur due to dispersion, the variation of a lens's refractive index with wavelength. Additionally, a lens may have a positive or a negative spherical aberration that causes light passing through the edges of lens to have a different focal point than light passing through the center of the lens. If the light passing through the edges of the lens focuses nearer the lens, the aberration is positive and vice-a-versa.

Additionally, an optical system may utilize astigmatism to manipulate the focus of light. Astigmatism may occur in two forms: third-order and non-axisymmetric astigmatism. Light may propagate from a given point in two planes: tangential plane and a sagittal plane. Rays that propagate in the tangential plane are tangential rays. The tangential plane may also be called the meridional plane. The second plane is the sagittal plane and is defined as the plane orthogonal to the meridional plane. In third-order astigmatism, sagittal and transverse rays form foci at different distances along the optic axis. These foci may be referred to as the sagittal focus and the transverse focus, respectively. The amount of aberration due to astigmatism is proportional to the square of the angle between the rays from the object and the optical axis of the system. The principles of astigmatism may provide a tool for varying the intensity distribution of light to enable trapping a particle using the photophoretic effects described herein.

Light reflected off of one or more scattering particles may be captured and used to generate a two-dimensional image of the three-dimensional image created by the photophoretic display device. The two-dimensional image may be displayed on, for example, a planar display of a portable electronic device. In some embodiments, the portable electronic device may include input hardware. For example, the planar display of the portable electronic device may be a touchscreen. The input hardware may be used to generate a user input signal and the user input signal can be sent to the photophoretic display device to manipulate the three-dimensional image in real time or near real time. Thus, a user can view the volumetric image generated by the photophoretic display device and the two-dimensional rendering of the volumetric image on the portable electronic device simultaneously and can move, shape, or otherwise manipulate the volumetric image as desired using the portable electronic device.

Referring generally to FIG. 1, a system including a photophoretic display device and an image converter for converting a three-dimensional image generated by the photophoretic display device to a two-dimensional image for display on a planar screen is shown. The photophoretic display device generally uses the photophoretic principles described herein to control the position and/or orientation of one or more scattering particles to form a volumetric image. The photophoretic display device includes one or more trap light sources and one or more illumination light sources that trap (i.e., hold and/or manipulate the position of) one or more scattering particles and illuminate the one or more scattering particles with visible light, respectively. The trap light source moves the trapped and illuminated scattering particles at a speed faster than detectable by the human eye to create an image. The image converter captures the light reflected by the scattering particles (i.e., the image) at one or more photosensitive detectors that are configured to generate an image signal to a processing device that converts the image signal to a two-dimensional image. In some embodiments, the two-dimensional image is displayed on a planar display (of a portable electronic device, for example) that includes input hardware configured to send a user input signal to the photophoretic display device. The user input signal may be used to control the photophoretic display device to manipulate the three-dimensional image, thereby changing the image generated on the planar screen of the portable electronic device. Accordingly, a user of a portable electronic device can manipulate the three-dimensional image as desired.

Figure 2:
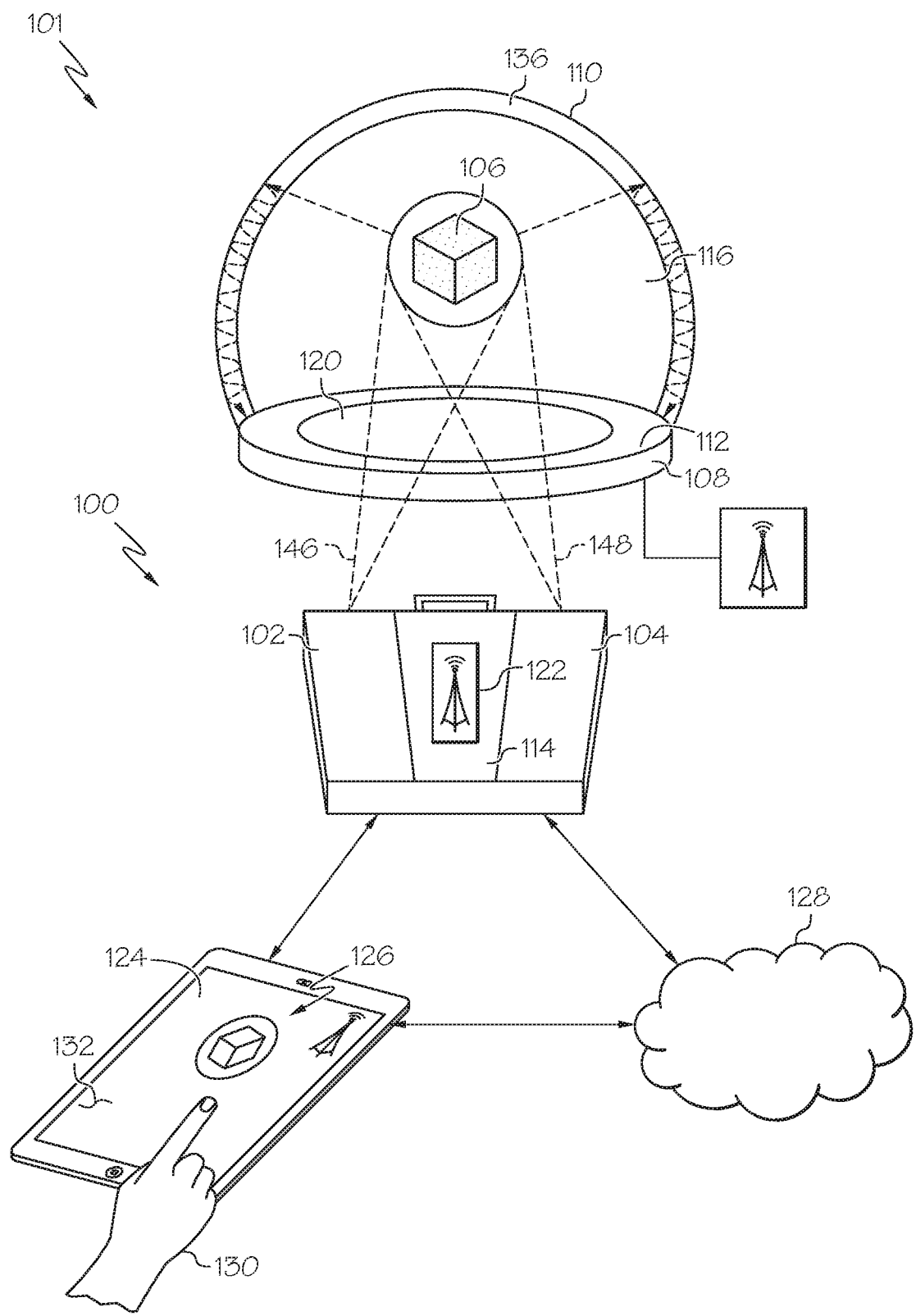
FIG. 2 depicts another exemplary embodiment of a system for rendering a volumetric image and interacting with the volumetric image using a planar display, according to one or more embodiments shown and described herein.

Referring now more specifically to FIGS. 1 and 2, a system 101 for rendering and interacting with a volumetric image using a two-dimensional display device is schematically depicted. The system 101 includes a photophoretic display device 100 that includes a trap light source 102 and an illumination light source 104. The trap light source 102 and the illumination light source 104 may be used to control the position and/or orientation of and to illuminate one or more scattering particles 106. The scattering particles 106 may be moved by the trap light source 102 at a speed faster than detectable by the human eye and simultaneously illuminated by the illumination light source 104 to generate a three-dimensional image. The system 101 also includes an image converter 108. The image converter 108 may include a light signal propagation director 110 and a light signal sensor 112. Some embodiments of the system 101 may include a scattering particle manipulation device 120 that may be used to control scattering particles 106 in addition to or in place of the trap light source 102. In some embodiments, the light signal propagation director 110 may at least partially surround and/or encapsulate a void 116 in which the one or more scattering particles 106 are disposed. Additionally, some embodiments of the system 101 may include a calibration visual sensor 114 that may capture visual calibration image data of the system 101 and/or the volumetric images produced by the system 101. The visual calibration image data captured by the calibration visual sensor 114 may be used to calibrate the volumetric image. As shown in FIGS. 1 and 2, the system 101 may include or communicatively couple to one or more of a portable electronic device 124 and an external network 128 (e.g., a cloud network). The portable electronic device 124 may include a planar display 132 for displaying a two-dimensional rendering 126 of the three-dimensional image generated by the photophoretic display device 100. In embodiments, the two-dimensional rendering 126 may be manipulated with a user input 130 to generate a user input signal which may be transmitted to the photophoretic display device 100 to change the volumetric image as will be described in greater detail herein. Accordingly, a user can change the volumetric image using the planar image on the planar display 132.

The photophoretic display device 100 may operate to trap and illuminate one or more scattering particles as described in greater detail herein. One or more of the trap light source 102 and the illumination light source 104 may be one or more sources of light, for example, a laser, a light emitting diode, etc. The trap light source 102 may be of sufficient frequency, amplification, and wavelength to manipulate the physical position of (i.e., to move) one or more particles. In some embodiments, the light generated by the trap light source 102 may be outside the visual spectrum of light. For example, the trap light source 102 may use infrared light. The illumination light source 104 may be used to illuminate the one or more particles moved by the trap light source 102. The illumination light source 104 may be configured to illuminate the one or more trapped particles with any wavelength of light, for example, with visible light at any wavelength on the visible spectrum, or with infrared or ultraviolet light. In some embodiments, the trap light source 102 and the illumination light source 104 may be combined into a single, co-linear beam of light, such that the one or more particles are trapped and illuminated by the same co-linear beam of light. The photophoretic display device 100 may include one or more lenses, reflectors, or other devices or implementations for bending, reflecting, focusing, or otherwise manipulating the light emitted by the trap light source 102 and the illumination light source 104.

Light from the trap light source 102 may be used to develop one or more forces across the one or more particles to trap the particle and control its movement in a three-dimensional environment. For example, the trap light source 102 may develop a temperature differential across the one or more scattering particles 106 to create a difference in momentum across the scattering particles 106 according to the principles described herein. In some embodiments, the one or more scattering particles 106 may be manipulated by a radiation pressure force created by the beam generated by the trap light source 102. In some embodiments, the trap light source 102 may be sent through a microscope objective or some other device configured to focus a beam as described herein and the one or more scattering particles 106 may be trapped at the beam waist, which may exhibit a strong electric field gradient. In some embodiments, lateral and axial (i.e., in the longitudinal direction of the beam generated by the trap light source 102) movement may be controlled using a specific light beam intensity profile that is generated with astigmatism aberration and a spatial light modulator (SLM). Additionally, the trap light source 102 may be used to turn, spin, polarize, or otherwise orient the one or more scattering particles 106 in a particular polarization and/or orientation. For example, the trap light source 102 may apply orienting torque to a trapped particle by anisotropically scattering polarized light off of the trapped particle. In some embodiments, the trapped particle may be oriented by changing one or more of a wavelength, an amplitude, or a frequency of the beam generated by the trap light source 102. Accordingly, the scattering particles may move based on the movement of the trap light source 102. In some embodiments, the trap light source 102 may move the one or more trapped scattering particles in the scattering particle screen 106 at a rate faster than detectable by the human eye in order to generate a three-dimensional image in cooperation with the illumination light source 104. It is contemplated that embodiments include any number of trap light sources 102. Additionally, it is contemplated that any source of light can be used to generate the trap beam. In some embodiments, the trap light source 102 is a laser configured to emit laser light.

The illumination light source 104 may illuminate the one or more scattering particles with visible or other forms of light. For example, the illumination light source 104 may be an RGB LED that illuminates the one or more scattering particles with visible light. Visible light generated by the illumination light source 104 and reflected from the one or more scattering particles may be used to reproduce an image of a scene that may be used to simulate the scene to an observer, for example. The intensity, wavelength, and position of the illumination light source 104 and/or the trap light source 102 may be controlled, for example, by a controller or other system (e.g., a processor and memory module that stores one or more processor-readable instruction sets).

In some embodiments, the beams generated by the trap light source 102 and/or the illumination light source 104 may be divided or combined by one or more of, for example: an optical grate, such as a Dammann grate (DG); a prism; a chiral liquid filter; and the like. Additionally, the trap light source 102 and/or the illumination light source 104 may be bent, aligned, or otherwise formed or manipulated using one or more of an optical filter, a lens, a prism, and the like. By dividing the light generated by the trap light source 102 and/or the illumination, one trap light source 102 and/or one illumination light source 104 may be used to manipulate and/or illuminate one or more scattering particles at a time using a single generated beam. In some embodiments, one or more of the trap light source 102 and the illumination light source 104 may be formed from a matrix of multiple lasers or other light sources (e.g., bulbs, LEDs, etc.) and the matrices may be used to form multiple trap and/or illumination beams.

The one or more scattering particles 106 may be held in place by the trap light source 102 and illuminated and moved to form the three-dimensional image. The one or more scattering particles 106 may be microscopic particles that reflect light when illuminated, for example, by the illumination light source 104. The scattering particles may be, for example, microscopic pieces of crushed silicon, silicon dioxide, silicon nitride, or other silicate product. In some embodiments, the scattering particles may be formed from a liquid, e.g., a liquid that can be used to create small flat particles. The scattering particles may be isotropic or anisotropic. In some embodiments, the one or more scattering particles 106 may be divided into one or more sections of one or more scattering particles and each section may selectively include isotropic and/or anisotropic particles, such that the various sections of the one or more scattering particles 106 reflect light differently from different angles, which may have one or more effects on the visual signal generated by the photophoretic display device 100. Anisotropic scattering particles may include multiple surfaces for reflecting light in various ways that may enable two or more distinct images to be displayed from two or more distinct vantages. The anisotropic scattering particles may include, for example, multiply-sided mirrors or prisms with intricate structures that can reflect light anisotropically. In some embodiments, the position and/or orientation of the one or more scattering particles 106 may be controlled by one or more of the trap light source 102 and the scattering particle manipulation device 120 to reflect illuminated light anisotropically in order to at least partially occlude one or more portions of the volumetric image from a particular angle.

The image converter 108 may include the light signal propagation director 110 and the light signal sensor 112. Referring to FIG. 1, the light signal propagation director 110 may include a reflective surface 134. In some embodiments, the light signal propagation director 110 may be configured to include or as an optical isolator or optical diode that allows incident light to pass through the reflective surface 134 from a first direction, but such that the reflective surface 134 reflects incident light from a second direction. For example, the reflective surface 134 may be a polarization dependent isolator. In some embodiments, the light signal propagation director 110 may include a Faraday rotator, for example. The Faraday rotator may be made from, as non-limiting examples, terbium doped borosilicate glass, terbium gallium garnet crystal, yttrium iron garnet crystal. Light traveling through a Faraday rotator may, for example, become polarized in any particular orientation and may be filtered or reflected by the reflective surface 134. In some embodiments, the reflective surface 134 may be an optical filter that allows particular wavelengths of light to pass through the filter but reflects other wavelengths. For example, the reflective surface 134 may be a dichroic filter. The reflective surface 134 may, for example, pass one or more of the trap beam and the illumination beam such that they can trap and/or illuminate the one or more scattering particles 106, which may change a wavelength of the trap beam and/or the illumination beam after reflection off of the one or more scattering particles 106 based on one or more optical properties of the beams and/or the scattering particles 106.

Referring to FIG. 2, the light signal propagation director 110 may be a waveguide 136. The waveguide 136 may be configured as an optical guide that transmits the optical beams reflected by the one or more scattering particles 106 with minimal loss of energy by restricting expansion of the beams to one dimension or two. The waveguide 136 may be, for example, an optical fiber. The waveguide 136 may be a dielectric waveguide and include a dielectric material with a high index of refraction that is surrounded by a material with a low index of refraction. The waveguide 136 may be a light pipe or a photonic-crystal fiber, for example. The waveguide 136 may be a planar waveguide or a channel waveguide, for example. In some embodiments, the waveguide 136 may allow light incident on the optical guide to pass through the waveguide 136 from a first direction, but may guide light incident on the waveguide from a second direction in a desired direction. For example, the waveguide 136 may guide incident light toward the light signal sensor 112. In some embodiments, the waveguide 136 is a glass dome. In some embodiments, the waveguide 136 is a clear plastic dome.

Referring to FIGS. 1 and 2, the light signal sensor 112 may generate a planar image signal based on the volumetric image created by the photophoretic display device 100. The light signal sensor 112 may be, for example, one or more cameras including, for example, a charge-coupled device (CCD) sensor or a complementary-metal-oxide semiconductor (CMOS) sensor, colorimeter, fiber optic sensors, electro-optical sensors, one or more light dependent resistors (LDR), one or more photodiodes, one or more phototransistors, one or more solar cells, or one or more quanta image sensors (QIS). The light signal sensor 112 may include one or more optical filters or built-in lenses for filtering or focusing the incoming signal. The light signal sensor 112 receives the signal from the light signal propagation director 110 and may convert the light signal to an electronic signal that may be used to generate the rendering of the volumetric image into a two dimensional image for display on the planar display.

The scattering particle manipulation device 120 may be used to manipulate one or more of a position and an orientation of the one or more scattering particles. For example, the scattering particle manipulation device 120 may hold, lift, or move the one or more scattering particles 106. In some embodiments, the scattering particle manipulation device 120 may polarize the one or more scattering particles. In some embodiments, the scattering particle manipulation device 120 may orient the one or more scattering particles in a particular orientation based on one or more anisotropic optical properties of one or more of the one or more scattering particles. For example, the scattering particle manipulation device 120 may orient the one or more scattering particles to occlude a portion or portions of the image generated using the one or more scattering particles 106 from any particular vantage point. For example, anisotropic scattering particles may be oriented such that an image generated using the particles appears different as between a first vantage and a second vantage. The scattering particle manipulation device 120 may use one or more of electromagnetic, magnetic, fluid pressure (e.g., air pressure, etc.), and ultrasonic forces to manipulate a position and/or an orientation of the one or more scattering particles.

Still referring to FIGS. 1 and 2, in some embodiments, one or more of the trap light source 102 and the scattering particle manipulation device 120 may be used to occlude one or more portions of an image generated using the one or more scattering particles 106. For example, the trap light source 102 and/or the scattering particle manipulation device 120 may orient one or more of the scattering particles 106 such that one or more portions of the volumetric image generated using the one or more scattering particles 106 is occluded from any particular vantage.

Still referring to FIGS. 1 and 2, in some embodiments, the volumetric image generated by the photophoretic trap display 100 may be calibrated using the calibration visual sensor 114, which may be located at a calibration visual sensor location where the calibration visual sensor 114 is capable of capturing an image of the volumetric image and generating calibration image data. Accordingly, the calibration visual sensor 114 may capture an image of the volumetric image and the photophoretic optical trap display 100 may alter the image generated based on the image data captured by the calibration visual sensor 114. More specifically, in some embodiments, an appearance of the volumetric image may be based on feedback image calibration data. In some embodiments, the system 101 may recalibrate the volumetric image on demand, such as based on the control of a user. In some embodiments, the system 101 may automatically recalibrate the volumetric image. The volumetric image may be calibrated, for example, in order to control a size, an orientation, a shape, a color, or any other visual aspect of the volumetric image. In some embodiments, the calibration visual sensor 114 may be used as a redundant input to or a substitute input for the light signal sensor 112 with respect to rendering the planar image of the volumetric image. For example, the calibration visual sensor 114 may be used to verify that one or more visual aspects of the planar image are rendered on the planar display correctly. Accordingly, the calibration visual sensor 114 may receive an input signal from one or more of the portable electronic device 124, the photophoretic display device 100, and the image converter 108.

Still referring to FIGS. 1 and 2, the portable electronic device 124 may include the planar display 132. The planar display 132 may be configured as an input device (e.g., a touchscreen) for receiving a user input 130. In some embodiments, the input device may include a keyboard, buttons, switches, touch-sensitive pads, microphones, and the like. The input device may be any device capable of transforming mechanical, optical, or electrical signals into a data signal capable of being transmitted by a transmission medium (e.g., a bus such as the bus 144 described in greater detail below). Specifically, the input device may include any number of movable objects that each transforms physical motion into a data signal that may be transmitted to one or more other components of the system 101 or to external components.

Figure 3:
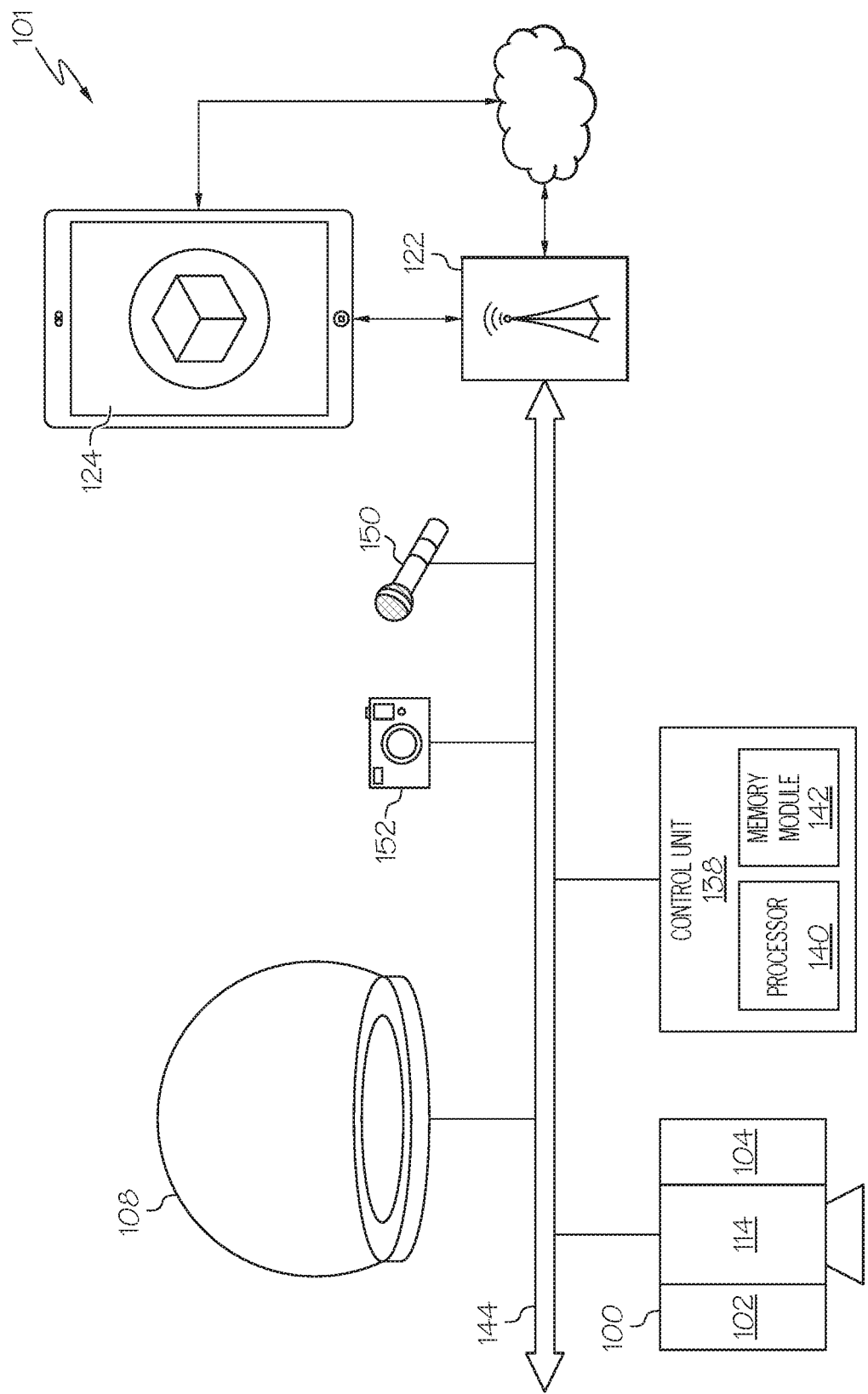
FIG. 3 depicts schematically depicts the system for rendering a volumetric image and interacting with the volumetric image using a planar display of FIG. 1, according to one or more embodiments shown and described herein.
Figure 4:
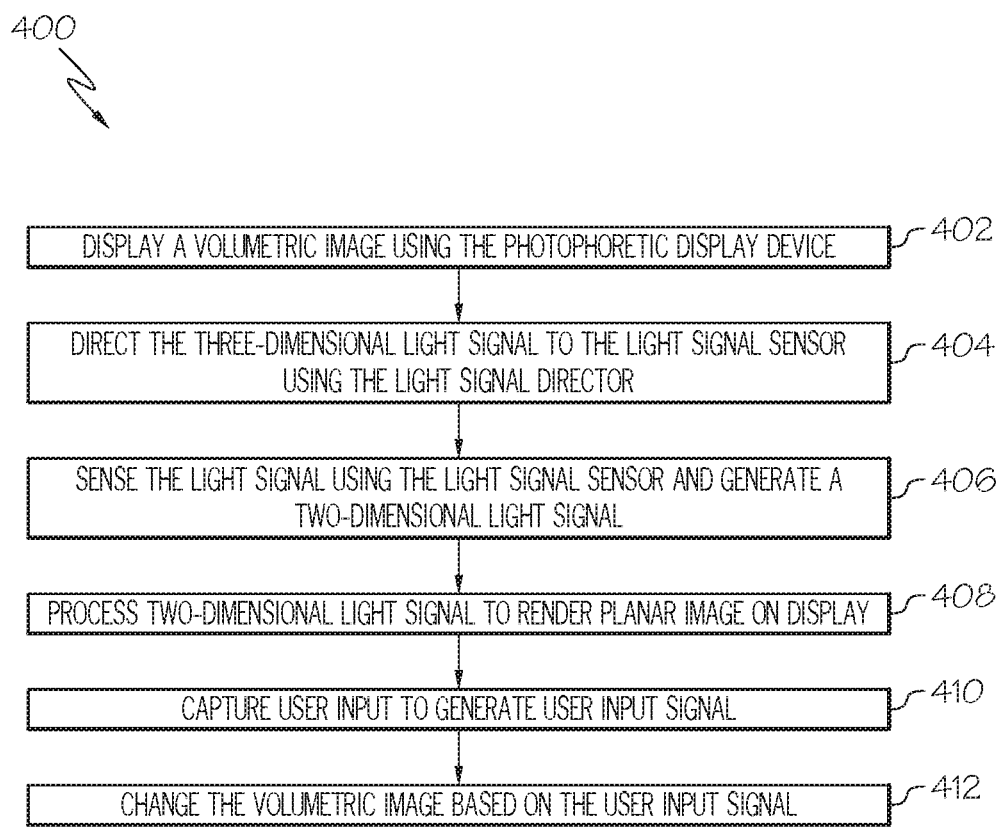
FIG. 4 depicts an exemplary method for rendering a volumetric image and interacting with the volumetric image using a planar display, according to one or more embodiments shown and described herein.

Referring now to FIG. 3, a schematic of an exemplary embodiment of the system 101 for rendering a volumetric image and interacting with the volumetric image using a planar display is shown. The system 101 includes the photophoretic display device 100 including the trap light source 102 and the illumination light source 104. The system 101 also includes the calibration visual sensor 114. While the calibration visual sensor 114 is shown as physically connected with the components of the photophoretic display device 100, it is to be understood that this is merely one arrangement and that the calibration visual sensor 114 could be physically separate from the photophoretic display device 100. Additionally, the system 101 shown in FIG. 3 includes the image converter 108, the portable electronic device 124, the network interface hardware 122, and a control unit 138 that includes, at least, a processor 140 and a memory module 142. In some embodiments, the portable electronic device 124 may include a microphone 150 and/or a camera 152 for receiving a user input. The various components of the system 101 shown in the exemplary embodiment are communicatively coupled by a bus 144.

The processor 140 may include any processing component(s) configured to receive and execute programming instructions (such as from the memory module 142). The instructions may be in the form of a machine-readable instruction set stored in the memory module 142 (e.g., one or more programming instructions). Accordingly, the processor 140 may be an electric controller, an integrated circuit, a microchip, a computer, or any other computing device. The processor 140 is communicatively coupled to the other components of the system 101 through the bus 144. Accordingly, the bus 144 may communicatively couple any number of processors 140 with one another, and allow the components coupled to the bus 144 to operate in a distributed computing environment. In some embodiments, the bus 144 is a CAN bus. Each of the components may operate as a node that may send and/or receive data. Furthermore, while the embodiment depicted in FIG. 3 includes a single processor 140, some embodiments may include more than one processor 140.

The memory module 142 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The memory module 142 may reside local to and/or remote from the system 101 and may be configured to store one or more pieces of data for access by the system 101 and/or other components.

The memory module 142 may be machine-readable memory (which may also be referred to as a non-transitory processor readable memory). The memory module 142 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory module 142 may be configured to store operating logic, which may be embodied as a computer program, firmware, or hardware, as an example and that may include an operating system and/or other software for managing components of the system 101.

As noted above, the system 101 includes the bus 144. The bus 144 may be formed from any medium that is capable of transmitting a signal such as, for example, conductive wires, conductive traces, optical waveguides, or the like. Moreover, the bus 144 may be formed from a combination of mediums capable of transmitting signals. In one embodiment, the bus 144 includes a combination of conductive traces, conductive wires, connectors, and buses that cooperate to permit the transmission of electrical data signals to components such as processors, memories, sensors, input devices, output devices, and communication devices. Accordingly, the bus 144 may be or include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 144 communicatively couples the various components of the system 101. As used herein, the term "communicatively coupled" means that coupled components are capable of exchanging data signals with one another such as, for example, electrical signals via conductive medium, electromagnetic signals via air, optical signals via optical waveguides, and the like. In some embodiments, the bus 144 may be coupled to network interface hardware for communicatively coupling the system 101 with one or more external networks. For example, the system 101 may communicatively couple with one or more external cloud networks using a wireless network connection, for example, using a wi-fi connection and/or a connection to a cellular network.

The microphone 150 may transform acoustic vibrations received by the microphone 150 into a speech input signal or other audio signal. The microphone 150 may be coupled to the bus 144 through the portable electronic device 124 and communicatively coupled to the processor 140. In some embodiments, the microphone 150 is a standalone device. The processor 140 may process speech and other input signals received from the microphone 150 and/or extract information from such signals. The microphone 150 may be used to record audio data from the user. For example, a user's voice may be recorded and stored (e.g., in the memory module 142) as a marker to identify the user in subsequent audio recordings captured by the system 101 or to identify one or more commands to the system 101 in conjunction with one or more voice recognition or speech recognition algorithms.

The camera 152 may be any device having an array of sensing devices (e.g., a CCD array, active pixel sensors, and the like) capable of detecting radiation in an ultraviolet wavelength band, a visible light wavelength band, or an infrared wavelength band. The camera 152 may have any resolution. The camera 152 may be an omni-direction imaging device or a panoramic imaging device. In some embodiments, one or more optical components, such as a mirror, fish-eye lens, or any other type of lens may be optically coupled to the camera 152. It should be understood that where the camera 152 or other systems described herein are described with respect to "image data" or an "image," such language encompasses "video data" or a "video." The camera 152 may be incorporated with the portable electronic device 124, for example, as components of a tablet computer, a smartphone, wearable glasses or the like. The camera 152 may also be a standalone device.

Referring to FIGS. 1-4, an exemplary method 400 describing operation of the depicted embodiments is shown. The method 400 may be executed based on instructions stored in the memory module 142 that are executed by the processor 140. As depicted, at step 402 the system 101 displays a volumetric image using the photophoretic display device 100 comprising the trap light source 102 that traps one or more scattering particles 106 and the illumination light source 104 that illuminates the one or more scattering particles 106. More specifically, the photophoretic display device generates a trap beam 146 and an illumination beam 148 using the trap light source 102 and the illumination light source 104, respectively. The trap beam 146 controls the position of the one or more scattering particles 106. The illumination beam 148 illuminates the one or more scattering particles. A controller (e.g., the control unit 138 of FIG. 3) controls the trap light source 102 and the illumination light source 104, moving the one or more scattering particles 106. The trap light source 102 may move the one or more scattering particles 106 through three-dimensions, for example, faster than the human eye can register motion to generate an image that appears to the human eye to have volume.

In some embodiments, the photophoretic display device may move the one or more scattering particles 106 through various portions of the void 116 at different rates to make portions of the volumetric image appear more or less opaque than others. For example, the speed with which the scattering particles 106 are moved through an axis at the center of the volumetric image may be slower than the scattering particles 106 are moved through the edges of the volumetric image, making the volumetric image appear more opaque near the axis at the center of the volumetric image, for example.

The volumetric image includes visible light that may be directed by the light signal propagation director 110. At step 404, the three-dimensional light signal emitted by the volumetric image is directed to the light signal sensor 112 using the light signal propagation director 110. In some embodiments, the light signal propagation director 110 is a reflective surface 134. In some embodiments, the light signal propagation director 110 is a waveguide 136. In some embodiments, the light signal propagation director 110 may be a device configured to direct the volumetric image (i.e., light scattered by the one or more light scattering particles 106) to the light signal sensor, for example, the light signal propagation director 110 may be a combination of one or more of a reflective surface, a waveguide, and any other device configured to direct the light signal of the volumetric image to the light signal sensor. The light signal propagation director 110 may surround the one or more scattering particles 106 and form a closed environment. For example, the one or more scattering particles 106 may be enclosed in a void 116 that may be evacuated such that only the one or more scattering particles 106 are inside the void 116. In other embodiments, one or more portions of the void 116 may be open to the atmosphere. In embodiments, the light signal propagation director 110 may be a lining or layer on, over, or inside an enclosure that encloses the void 116.

The light signal sensor 112 senses the light signal directed by the light signal propagation director 110 and generates a two-dimensional light signal at step 406. The light signal sensor 112 may include one or more of one or more cameras, one or more light dependent resistors (LDR), one or more photodiodes, one or more photo-transistors, and one or more solar cells. In some embodiments, the trap light source 102 and the illumination light source 104 may update the volumetric image at a speed greater than the light signal sensor 112 senses or can sense such that the volumetric image is completely captured by the light signal sensor 112. In some embodiments, the photophoretic display device 100 may be configured to draw one portion of the volumetric image and the light signal sensor 112 may be configured to sense only the generated portion of the volumetric image. For example, the volumetric image may be drawn subsequently in a pattern of sectors and the light signal sensor 112 may be configured to sense light from the volumetric image subsequently in a pattern of sectors. In some embodiments, the photophoretic display device 100 may be configured to update a certain number, color, or other group of pixels in a particular sequence or based on some predefined pattern or operation and the light signal sensor 112 may be configured to sense light in a similar predefined pattern or operation.

At step 408, the two-dimensional light signal may be processed to render a planar image that is based on the volumetric image created by the photophoretic display device 100. The two-dimensional light signal may be processed, for example, by the processor 140. The two-dimensional light signal may be processed using any image or light signal processing algorithm or software to generate a planar image transmitted to the portable electronic device 124. The two-dimensional rendering 126 may be displayed on the planar display 132. The two-dimensional rendering 126 may include one or more of geometry, viewpoint, texture, lighting, and shading information as a description of the volumetric image. The two-dimensional rendering 126 may be generated, for example, using a graphics processing unit (GPU). In some embodiments, the GPU may be a component of the controller 138 or may separate from the controller 138. The two-dimensional rendering may be generated using one or more of scanline rendering and rasterization, ray casting, radiosity, and ray tracing, for example.

At step 410, a user input may be captured using, for example, the portable electronic device 124. For example, the planar display 132 may be configured as a touchscreen-enabled display. Embodiments are not limited to such an arrangement, however, and it is contemplated that the user input could come from one or more separate electronic devices (e.g., a laptop computer including mouse and/or keyboard, etc.). The system 101 may generate a user input signal based on the user input. The system 101 may generate a user input signal, for example, using a capacitive touch display or other touchscreen hardware and/or software that may be configured to receive a tactile input and convert it to an electrical signal. The user may swipe, poke, pinch, pull, or make any other gesture or tactile command to move the two-dimensional rendering of the image. In response, the image on the display may rotate, move, transpose, change one or more of a color, an opacity, a shape, or may make any other change in appearance based on the user's tactile input.

In some embodiments, the portable electronic device 124 may include the microphone 150 or other audio recording device for receiving an audible signal for generating the user input signal. For example, the user may capture a command such as, "Rotate the volumetric image 180 degrees," and the volumetric image may rotate based on the audible command. Accordingly, the system 101 may include one or more speech or audible recognition algorithms or software for recognizing and interpreting audible commands and the system 101 may recognize audible instructions to receive the user's input commands to generate the user input signal based on the audible instructions.

In some embodiments, the camera 152 of the portable electronic device 124 may be used to record a user input to manipulate one or more visual characteristics of the image. For example, a user may make one or more gestures that are captured by a camera of the portable electronic device 124. Accordingly, the portable electronic device 124 may be capable of accessing one or more processor-readable instructions including image or pattern recognition algorithms that can recognize gestures and other visual features of the user to receive the user's input commands to generate the user input signal based on such visual commands. The image or pattern recognition algorithms may be capable, for example, of classification, feature extraction, multi-scale signal analysis, pattern recognition, and projection. The image or pattern recognition algorithms may utilize, for example, one or more of anisotropic diffusion, hidden markov models, image editing, image restoration, independent component analysis, linear filtering, neural networks, partial differential equations, pixilation, principal components analysis, self-organizing maps, and wavelets to process image signals generated by a camera on the portable electronic device.

At step 412, the system 101 may change the volumetric image based on the user input signal. For example, the system 101 may change the shape, color, aspect, size, focus, occlusion, or any visual aspect of the volumetric image based on the user input signal. The user input signal may cause the system 101 to zoom, pan, rotate, turn, spin, flip, or cause some other visual change to the volumetric image. The photophoretic display device 100 may change one or more aspects of the trap light source 102 and/or the illumination light source 104 to change the volumetric image. For example, the photophoretic display device 100 may move the trap light source 102 and/or the illumination light source 104, may change an illumination beam wavelength, may change some orientation or polarization of the one or more trapped particles 106, or may make some other change to one or more aspects of the photophoretic display device 100 to change the volumetric image. In some embodiments, the system 101 may change an orientation and/or a polarization of the one or more scattering particles 106 using the scattering particle manipulation device 120 in addition to, or in place of, the trap light source 102. For example, the system 101 may use one or more of electromagnetic, magnetic, fluid pressure (e.g., air pressure, etc.), and ultrasonic forces to manipulate a position and/or an orientation of the one or more scattering particles.

It should now be understood that a system for generating a volumetric image and interacting with the volumetric image using a planar display may include a photophoretic display device, an image converter, and a portable electronic device. The system can be used to render a two-dimensional image of the volumetric image generated by the photophoretic display device and to interact with the two-dimensional image to move or manipulate the volumetric image. Thus, the volumetric image can be displayed and changed on a display of the portable electronic device giving a user the option to change the volumetric image using the portable electronic device. Such systems may be useful in medical applications, computer graphics applications, robotics applications, or any other application that may require the capability of interacting with a volumetric image or display.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a photophoretic display device comprising:
      a trap light source; and
      an illumination light source;
   an image converter comprising:
      a light signal propagation director; and
      a light signal sensor; and
   a control unit, wherein
   the trap light source is configured to trap a scattering particle and the illumination light source is configured to illuminate the scattering particle that the trap light source is configured to trap such that the photophoretic display device generates a volumetric image,
   the light signal propagation director is configured to direct a visual signal of the volumetric image to the light signal sensor, the light signal sensor is configured to sense the visual signal and to generate a planar image signal based on the visual signal, and the control unit is configured to:
send the planar image signal to a planar display;
render the planar image on the planar display;
receive a user input signal on the planar display in response to sending the planar image signal; and
control one or more of the trap light source and the illumination light source to change the volumetric image based on the user input signal.

2. The system of claim 1, wherein the light signal propagation director comprises a reflective surface.

3. The system of claim 2, wherein the reflective surface comprises an optical filter that allows incident light to pass through the reflective surface from a first direction, but reflects incident light from a second direction.

4. The system of claim 1, wherein the light signal propagation director comprises a waveguide.

5. The system of claim 4, wherein the waveguide comprises an optical guide that allows light incident on the optical guide to pass through the waveguide from a first direction, but guides light incident on the waveguide from a second direction to the light signal sensor.

6. The system of claim 1, further comprising a calibration visual sensor that is configured to generate calibration image data and the planar image signal is based on the calibration image data.

7. The system of claim 1, wherein the light signal sensor comprises one or more of one or more cameras, one or more light dependent resistors, one or more photodiodes, one or more photo-transistors, and one or more solar cells.

8. The system of claim 1, further comprising one or more scattering particles, wherein the one or more scattering particles exhibit anisotropic optical properties such that a view of the volumetric image can be at least partially occluded as compared between a first vantage and a second vantage.

9. The system of claim 8, further comprising: a scattering particle manipulation device that is configured to manipulate one or more of a position and an orientation of one or more of the one or more scattering particles.

10. The system of claim 9, wherein the scattering particle manipulation device manipulates one or more of the position and the orientation of one or more of the one or more scattering particles using one or more of magnetic forces, electromagnetic forces, ultrasonic forces, and fluid pressure.

11. A system comprising:
a photophoretic display device configured to generate a volumetric image;
a light signal propagation director;
a light signal sensor; and
a control unit, wherein:

the light signal propagation director propagates the volumetric image to the light signal sensor, and
the control unit generates a two-dimensional image based on an output of the light signal sensor.

12. The system of claim 11, wherein the photophoretic display device comprises a trap light source configured to trap one or more scattering particles and an illumination light source configured to illuminate the one or more scattering particles to generate the volumetric image.

13. The system of claim 12, wherein the one or more scattering particles are anisotropic particles that exhibit one or more anisotropic optical properties such that a view of the volumetric image can be at least partially occluded as compared between a first vantage and a second vantage.

14. The system of claim 11, wherein the light signal propagation director comprises a reflective surface.

15. The system of claim 14, wherein the reflective surface comprises an optical filter that allows light incident on the optical filter to pass through the reflective surface from a first direction, but reflects light incident on the optical filter from a second direction to the light signal sensor.

16. The system of claim 11, wherein the light signal propagation director comprises a waveguide.

17. The system of claim 16, wherein the waveguide comprises an optical filter that allows light incident on the optical filter to pass through the waveguide from a first direction, but guides light incident on the waveguide from a second direction to the light signal sensor.

18. A method of changing a volumetric image comprising:
displaying the volumetric image using a photophoretic trap display comprising a trap light source configured to trap one or more scattering particles and an illumination light source configured to illuminate the one or more scattering particles;
directing light from the volumetric image to a light signal sensor with a light signal propagation director;
generating a planar image based on an output of the light signal sensor;
rendering the planar image on a planar display;
capturing a user input on the planar display;
generating a user input signal based on the user input; and
changing the volumetric image based on the user input signal.

19. The method of claim 18, wherein the one or more scattering particles exhibit one or more anisotropic optical properties such that a view of the volumetric image can be at least partially occluded as compared between a first vantage and a second vantage.

20. The method of claim 18, wherein the light signal propagation director comprises one or more of a reflective surface and a waveguide.

* * * * *